(12) United States Patent
Broguiere et al.

(10) Patent No.: US 8,025,918 B2
(45) Date of Patent: Sep. 27, 2011

(54) HIGH DEFINITION PRINTING WITH WATERBORNE INKS ON NON-POROUS SUBSTRATES

(75) Inventors: Julie Broguiere, Paris (FR); Jean-Christophe Castaing, Burlington, NJ (US); Gilda M. Lizarraga, Chesterfield, NJ (US)

(73) Assignee: Rhodia, Inc., Cranbury, NJ (US)

( * ) Notice: Subject to any disclaimer, the term of this patent is extended or adjusted under 35 U.S.C. 154(b) by 524 days.

(21) Appl. No.: 12/271,241

(22) Filed: Nov. 14, 2008

(65) Prior Publication Data
US 2009/0130295 A1 May 21, 2009

Related U.S. Application Data

(60) Provisional application No. 60/988,581, filed on Nov. 16, 2007.

(51) Int. Cl.
| | |
|---|---|
| B05D 5/12 | (2006.01) |
| B05D 5/00 | (2006.01) |
| B05D 1/38 | (2006.01) |
| C08F 230/08 | (2006.01) |
| C08F 26/10 | (2006.01) |
| C08F 26/06 | (2006.01) |
| B32B 27/10 | (2006.01) |
| B32B 27/08 | (2006.01) |
| C08L 43/04 | (2006.01) |

(52) U.S. Cl. .......... 427/58; 526/279; 526/264; 526/259; 524/547; 427/256; 427/269; 427/265; 428/452; 428/412; 428/446

(58) Field of Classification Search .................. 526/279, 526/264, 259
See application file for complete search history.

(56) References Cited

U.S. PATENT DOCUMENTS

| | | | |
|---|---|---|---|
| 4,139,692 A * | 2/1979 | Tanaka et al. ............... 522/99 |
| 4,500,695 A * | 2/1985 | Ivani ............................ 526/279 |
| 6,818,719 B2 * | 11/2004 | Fujisawa et al. .......... 526/323.2 |
| 6,828,030 B2 | 12/2004 | Arimura et al. |
| 2002/0107337 A1 * | 8/2002 | Rosenzweig et al. ........ 525/474 |
| 2006/0004165 A1 * | 1/2006 | Phelan et al. ................ 526/279 |
| 2006/0012750 A1 * | 1/2006 | Nakamura et al. ........ 351/160 R |
| 2007/0129474 A1 * | 6/2007 | Salamone et al. ........... 524/261 |
| 2007/0216860 A1 * | 9/2007 | Yin et al. .................. 351/160 R |
| 2008/0143003 A1 * | 6/2008 | Phelan ........................ 264/1.36 |

FOREIGN PATENT DOCUMENTS

WO   WO 03/044103   5/2003

OTHER PUBLICATIONS

M. Urbala, et al., "The synthesis of allyl ehter functionalized siloxane monomers under ultrasonic irradiation at ambient conditions", Ultrasonics Sonochemistry, vol. 11 Issue 6, pp. 409-414, Sep. 2004.

* cited by examiner

Primary Examiner — Robert Loewe
(74) Attorney, Agent, or Firm — Michael B. Fein; Cozen O'Connor; Jericho Pacho

(57) ABSTRACT

Compositions comprising a silyl-containing copolymer of a monomer system comprising:
  (A) a silyl-containing monomer having a structural formula (A)

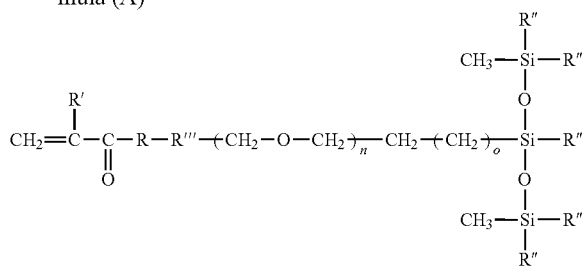

Wherein n=1-20, o=1-5
R=O or NH
R'=H or CH3
R"=$C_1$-$C_{12}$ alkyl

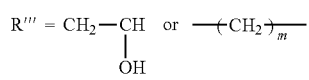

wherein m=1-20;

(B) a neutral, hydrophilic, ethylenically unsaturated monomer; and (C) a cationic ethylenically unsaturated monomer are disclosed. Aqueous solutions of the silyl-containing copolymer form transparent coatings on substrates which have very high contact angles with aqueous solutions and receive aqueous ink with very low bleeding. Substrates coated with the copolymer, methods for printing images, and methods of forming a portion or all of an electronic feature, are also disclosed.

20 Claims, 14 Drawing Sheets

3a

3b

HIGH DEFINITION PRINTING WITH WATERBORNE INKS ON NON-POROUS SUBSTRATES

CROSS-REFERENCE TO RELATED APPLICATIONS

Benefit of U.S. Provisional Application Ser. No. 60/988,581, filed Nov. 16, 2007, is claimed. Said application is hereby incorporated by reference.

BACKGROUND OF THE INVENTION

The present invention relates to the field of printing with waterborne inks on substrates, especially non-porous substrates, to coating compositions which can condition such substrates for high definition printing with waterborne inks, substrates coated with such compositions capable of receiving aqueous ink, methods of coating the substrates with the coating compositions so as to improve the ability of the substrate to receive waterborne ink, and methods of printing with waterborne inks on coated substrates.

Printing with waterborne inks on non-porous substrates presents well known problems, for example bleeding, which is related to wettability. If the non-porous substrate is too hydrophobic, waterborne inks tend to dewet or retract. If the non-porous substrate is too hydrophilic, waterborne inks tend to spread. In either case, the resultant printing problem will be referred to herein as "bleeding," and is a problem to which the present invention is directed.

In addition, the use of water-based inkjet inks on non-porous substrates such as plastics is known to be very problematic due to wetting problems as well as slow drying, which for non-absorbent surfaces has to occur only by evaporation. Others have suggested using polyvinyl alcohol as a coating for such substrates and including hydrophilic silica gel. Polyvinyl alcohol and pigments such as titanium dioxide for suitable substrate coatings have been suggested. Salts of high molecular weight carboxylic acids which lock the aqueous dye based inks into the surface by ionic interaction have also been suggested.

In spite of all the prior attempts at solving this problem, there remains a long-felt need in this art for a way to condition non-porous surfaces to receive waterborne ink in high definition, with low or no bleeding. It is therefore an object of the present invention to provide improved coatings for substrates to be printed with waterborne ink formulations.

It is a further object of the invention to provide substrates which are suitable for aqueous ink jet printing processes.

Another object is to provide waterborne ink jet printing objects such as paper or plastic.

A further object is to provide a method of printing on hydrophobic media such as polyethylene terephtalate, polyester, polyamide, polypropylene, and the like, with water-based inks.

SUMMARY OF THE INVENTION

These objects, and others which will become apparent from the following description, are achieved by the present invention which comprises in one aspect a solution to the bleeding problem with water borne inks on non-porous substrates by depositing a special coating on the substrate that will give the ink droplets a spherical shape and will pin them so that they will neither spread nor retract. The special coating composition, which is novel, comprises a silyl-containing copolymer of a monomer system comprising (A) a silyl-containing monomer having a structural formula (I)

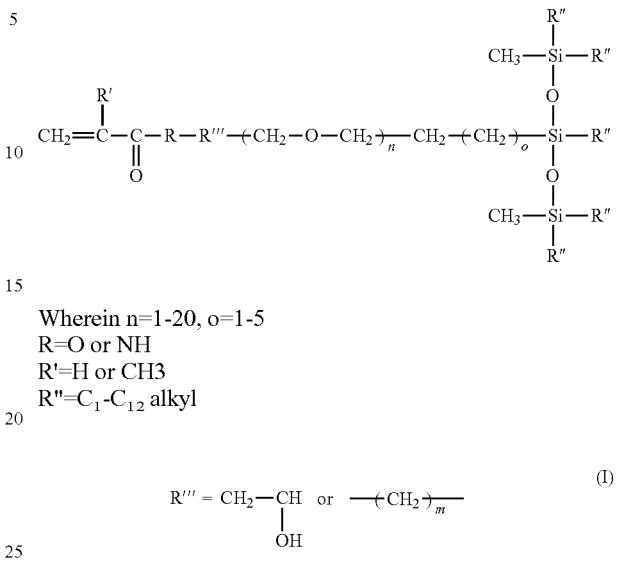

Wherein n=1-20, o=1-5
R=O or NH
R'=H or CH3
R"=$C_1$-$C_{12}$ alkyl wherein m=1-20
(B) a neutral, hydrophilic, ethylenically unsaturated monomer; and (C) a cationic ethylenically unsaturated monomer. The substrate coating composition can be provided in the form of a solution comprising sufficient water to dissolve the copolymer, preferably including a wetting agent. When present, the wetting agent can comprise preferably up to 10 percent by weight, based on weight of the silyl copolymer. Suitable wetting agents include, for example, non ionic surfactants.

The resultant novel coating has a very high contact angle with aqueous solutions, greater than 100° in most cases, and even greater than 120° in many cases, which limits ink spreading onto the surface. The special coating also has the ability to pin aqueous droplets. It limits spreading of aqueous solutions on the surface and improves resolution when an aqueous ink formulation is deposited thereon.

In another aspect, the invention is an aqueous solution of the silyl copolymer, preferably including the wetting agent, such composition capable of forming a transparent coating which is an excellent receptor for waterborne inks.

In another aspect the invention comprises substrates coated with the special coating composition and dried.

The method of producing printed images with water based ink on a surface with no bleeding is another aspect of the invention, such method comprising the steps of: (a) providing an object having a surface; (b) coating at least part of the surface of the object with an aqueous solution of the special coating composition; (c) evaporating off the volatile part of the mixture; (d) waiting a period of time after drying in order to let the coating develop its surface properties; (e) providing ink comprising a colorant and aqueous carrier; and (f) applying the ink onto the surface of the coating on the object. This aspect is especially advantageous for non-porous substrates such as plastics, and for water based inkjet inks.

The coating composition can also be used, in another different aspect of the invention, to form a portion or all of an electronic feature, by (a) providing a first substrate having a first surface; (b) coating the first surface with an aqueous solution of the copolymer to form a modified surface; and (c) applying an ink to at least a portion of the modified surface, wherein the modified surface interacts with the ink to inhibit one or both lateral migration and/or longitudinal migration of the applied ink, and wherein the applied ink forms at least a portion of the electronic feature.

BRIEF DESCRIPTION OF THE DRAWINGS

FIG. 4a The PET surface has been spin coated with a solution containing 8% of the previous copolymer MAPTAC/VP/SiAM and 30% isopropyl alcohol. The surface is printed one day after casting the film, while the contact angle is still low (~40°).

FIG. 4b The PET surface has been spin coated with a solution containing 8% of the previous copolymer MAPTAC/VP/SiAM and 30% isopropyl alcohol. The surface is printed 2 weeks after casting the film, once the contact angle has reached a high value (~130°).

FIG. 4c The PET surface has been spin coated with a solution containing 8% of poly(vinylpyrrolidone) (PVP) and 30% isopropyl alcohol. The surface is printed 2 weeks after casting the film.

FIG. 4d The PET surface has been spin coated with a solution containing 8% of poly(vinyl alcohol) (PVA) and 30% isopropyl alcohol. The surface is printed 2 weeks after casting the film.

FIG. 4e The PET surface has been spin coated with a solution containing 8% of Polyquaternium 11 (PQ 11: copolymer vinylpyrrolidone and dimethylaminoethyl methacrylate) and 30% isopropyl alcohol. The surface is printed 2 weeks after casting the film.

FIG. 4f The pattern is printed on a commercial transparency for inkjet printing having a rough surface.

FIG. 4g The pattern is printed on a non-treated PET surface.

DETAILED DESCRIPTION

Figure 1:
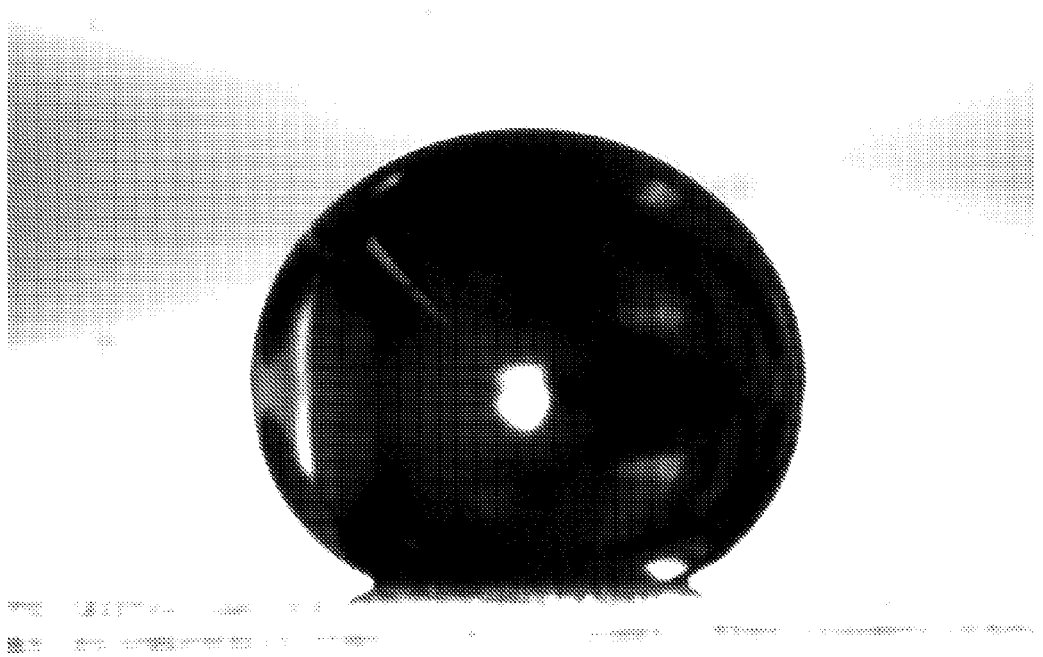
FIG. 1 is a photo of a droplet on a surface coated with a copolymer of the invention (MAPTAC/N-vinylpyrrolidone/silyl-containing monomer methyl di(trimethylsiloxy)sylyl-propyl-glycerol acrylate)
Figure 2:
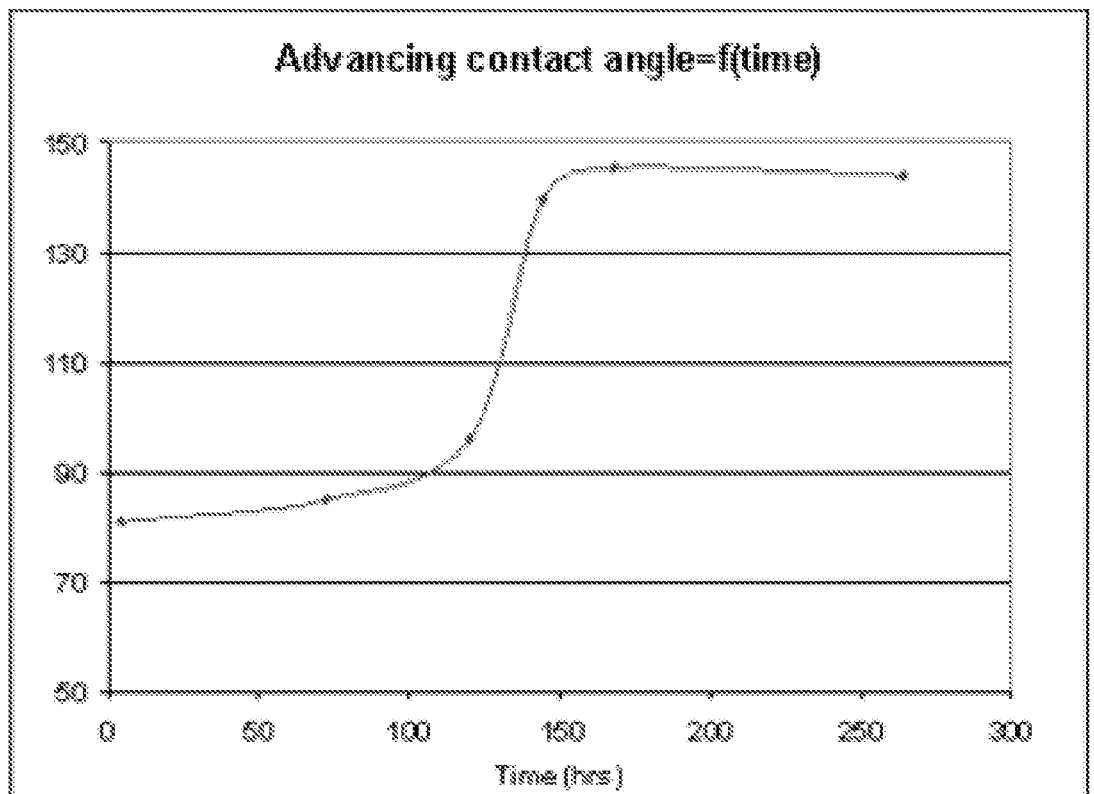
FIG. 2 is a graph showing the change of contact angle with time for a water droplet deposited on a surface coated with the aforementioned copolymer.
Figure 3A:
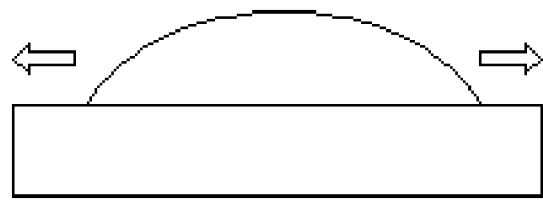
FIG. 3a is a drawing of a droplet of water on a non treated polyethylene terephtalate (PET) surface (contact angle ~60°, significant bleeding)
Figure 3B:
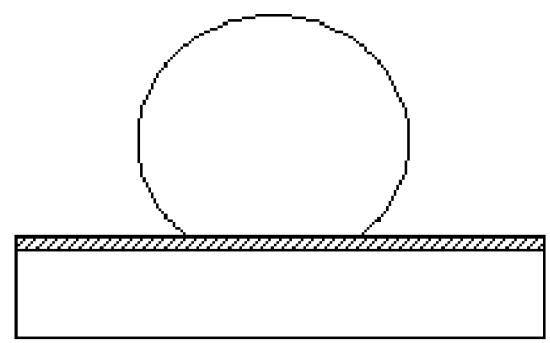
FIG. 3b is a drawing of a droplet of water on a PET surface coated with the previous polymer (contact angle ~130°, limited bleeding).
Figure 4A:
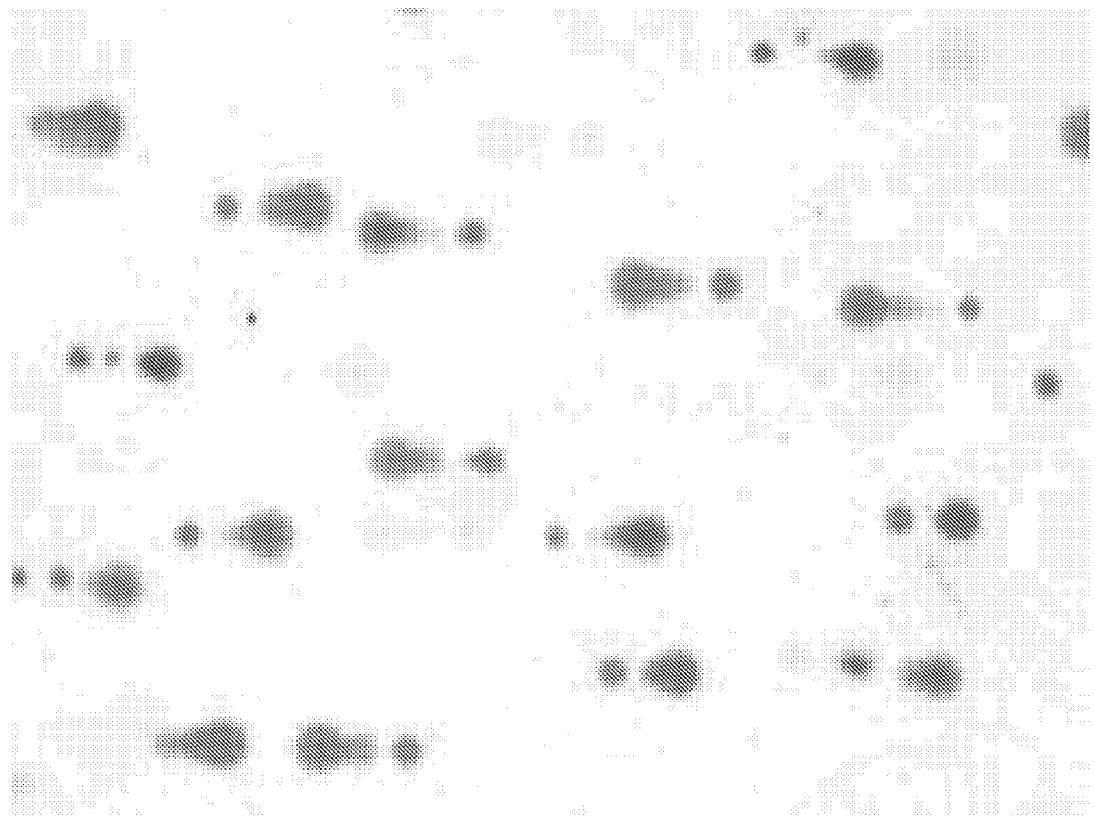
FIG. 4a to FIG. 4g are microscope photos (50×) of PET surfaces printed with color ink droplets. The PET surfaces have previously received different treatments.
Figure 4B:
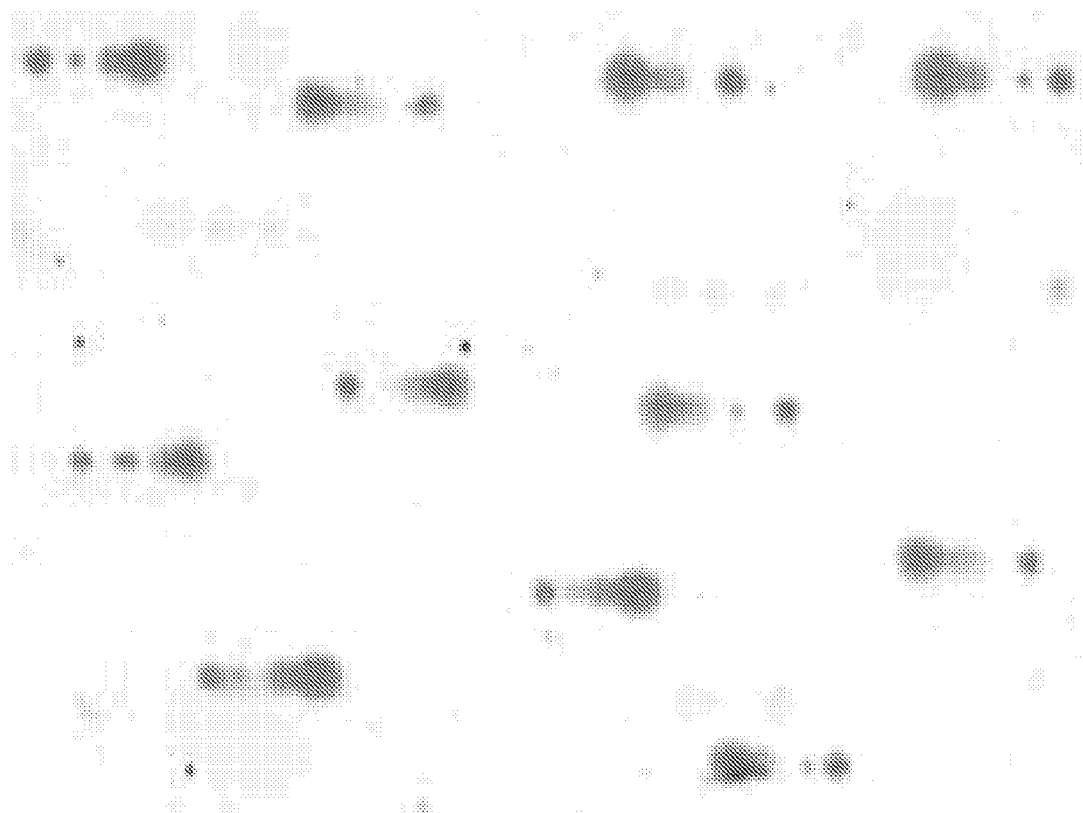
Figure 4C:
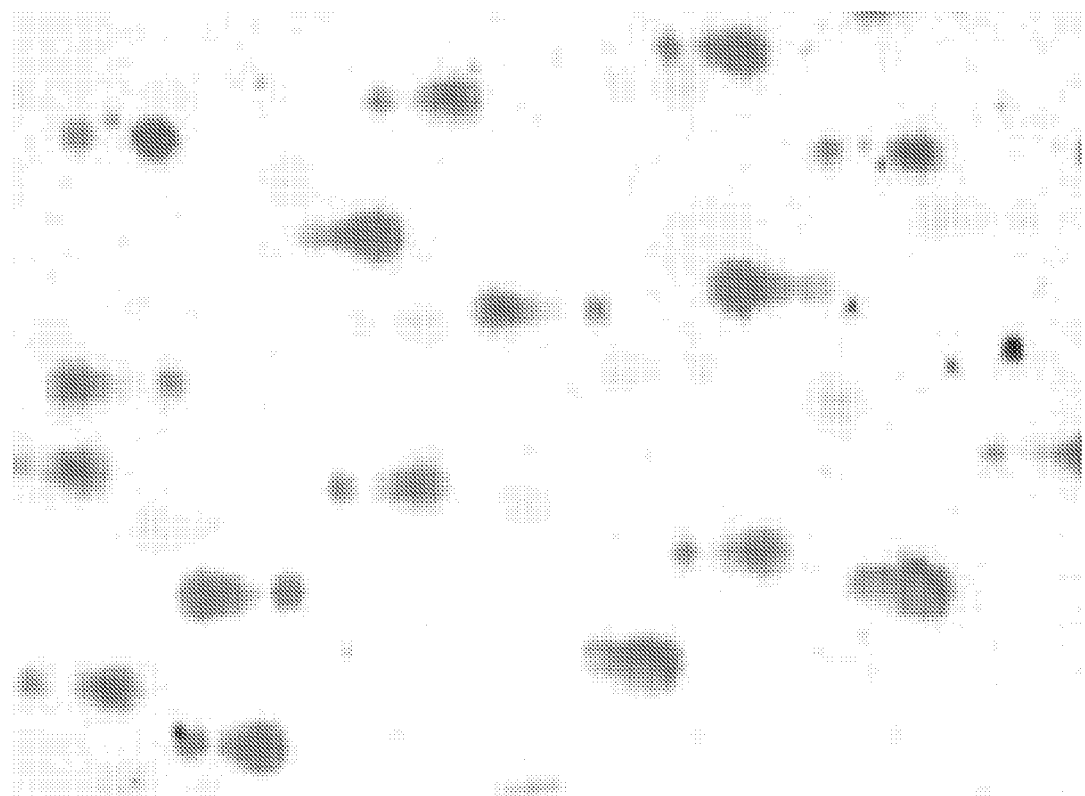
Figure 4D:
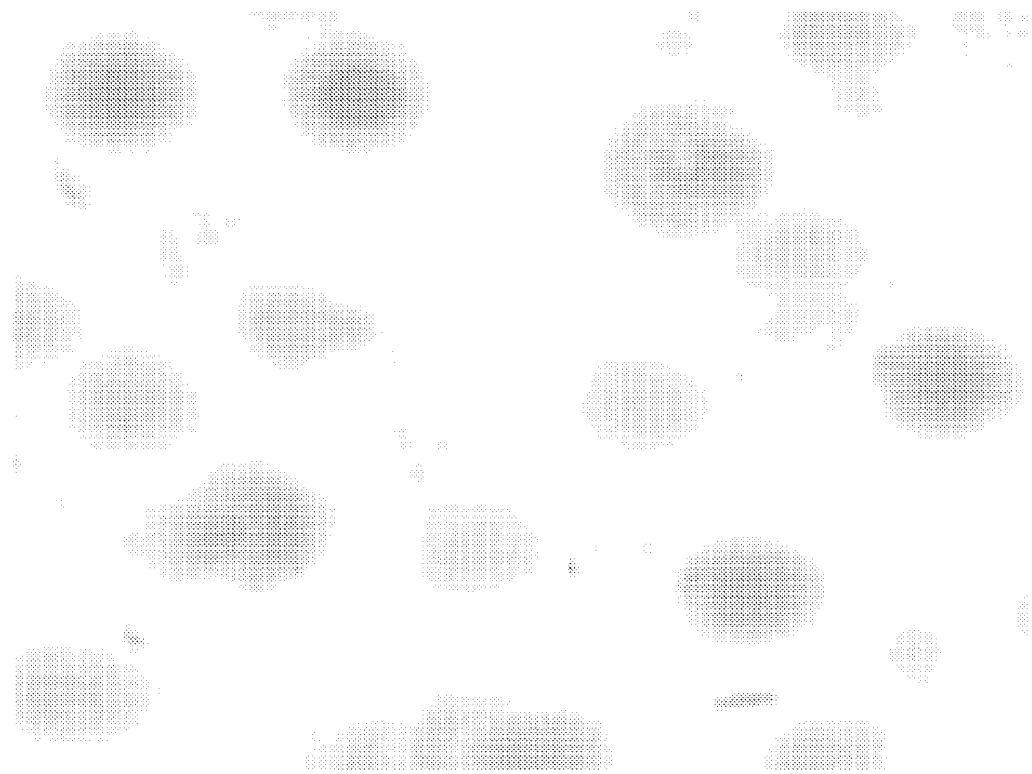
Figure 4E:
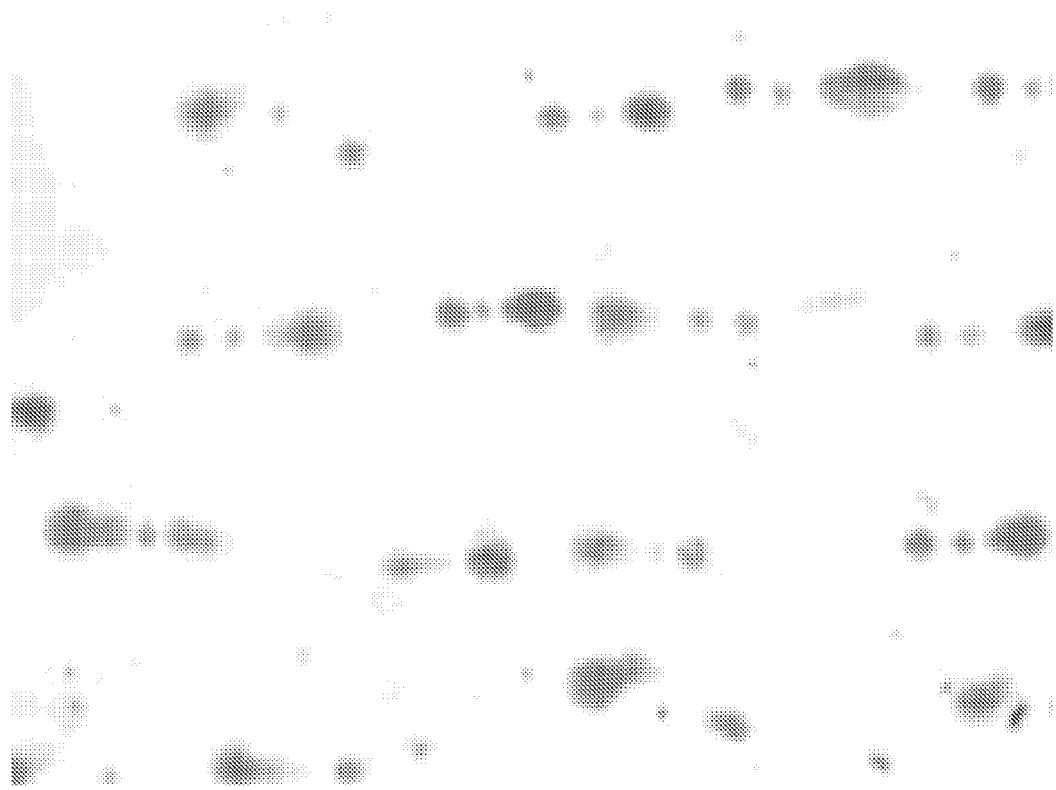
Figure 4F:
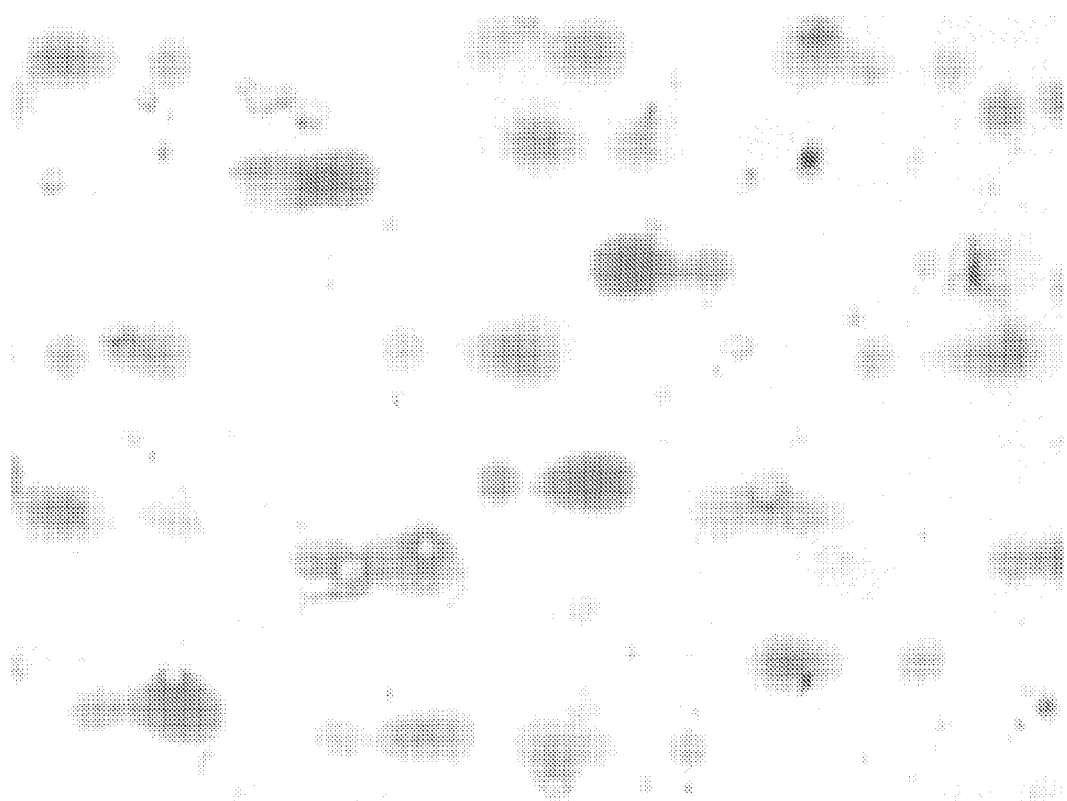
Figure 4G:
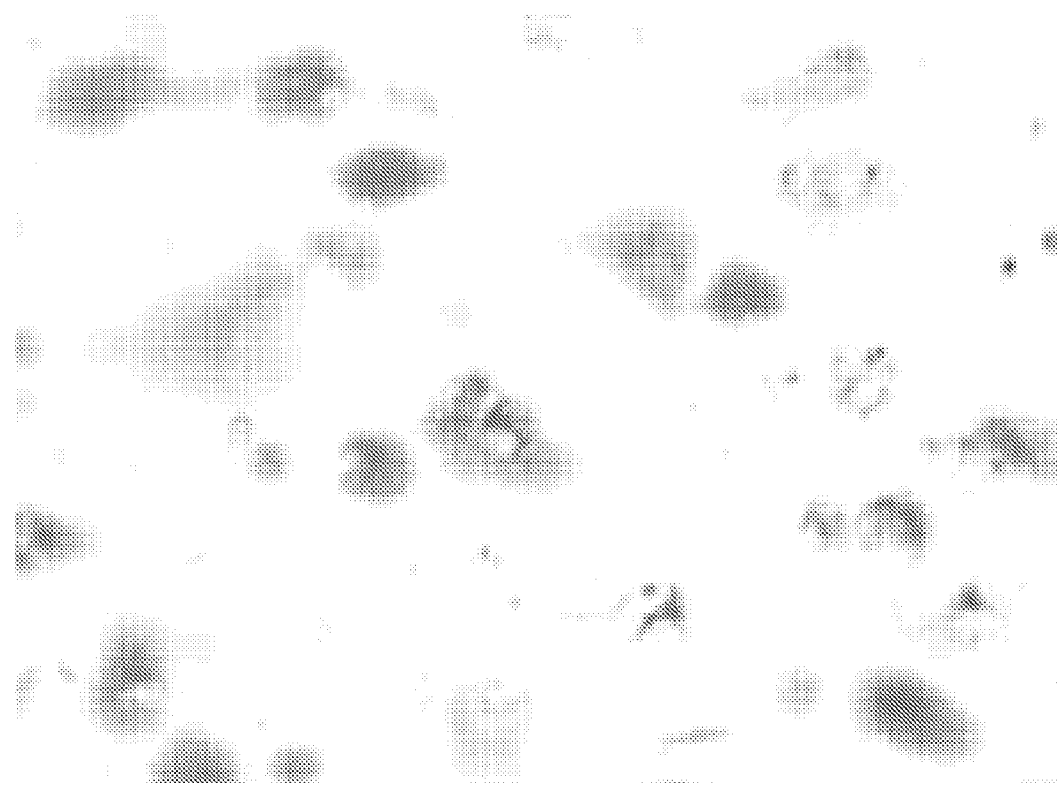

The special coating composition of the invention comprises a silyl-containing copolymer of the monomer system comprising monomers (A), (B), and (C). Monomer (A), the silyl-containing monomer, contributes to hydrophobic behavior of the resultant copolymer. Monomer (A) preferably is represented by formula (I)

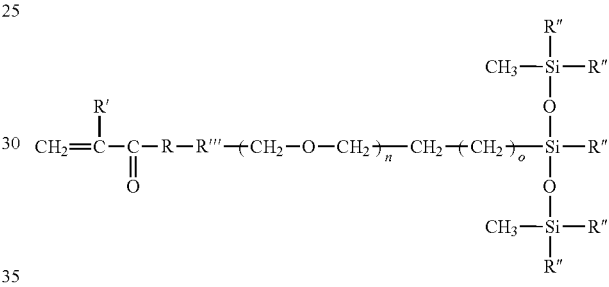

Wherein n=1-20, o=1-5
R=O or NH
R'=H or CH3
R"=$C_1$-$C_{12}$ alkyl $$R''' = CH_2-\underset{OH}{CH} \text{ or } -(CH_2)_m-$$

wherein m=1-20

Preferred monomers of formula I have R"=—$CH_3$, R=O, and R'''=—$CH_2$—CH(OH)— as represented by formula (II):

$$\begin{array}{c}\text{(II)}\end{array}$$

Examples of suitable monomers (A) include, for example, methyl di(trimethylsiloxy)sylyl propylglycerol acrylate and methyl di(trimethylsiloxy)sylyl propylglycerol methacrylate.

The copolymer of a monomer system comprising monomers (A), (B), and (C) has hydrophilic and hydrophobic components and, when coated on a surface, causes water droplets to bead on the surface with contact angle measurements usually between 120° and 145°.

In most embodiments, based on 100 parts by weight, (A) is present within the range of 1-40, (B) is present in the range of 30-98, and (C) is present in a range of 1-69. Preferred relative weight ranges for (A), (B), and (C) are 1-20: 50-98: and 1-30, respectively.

Suitable neutral, hydrophilic, ethylenically unsaturated monomers (B) include, for example, vinyl pyrrolidone, vinyl caprolactam, vinyl imidazole, vinyl carbazole, 2-vinyl pyridine, 4-vinyl pyridine, 5-vinyl pyridine, hydroxyethyl methacrylate, hydroxyethyl acrylate, hydroxypropyl methacrylate, hydroxypropyl acrylate, glycerol monomethacrylate, dimethylaminoethyl acrylate, dimethylaminopropyl acrylate, dimethylaminoethyl methacrylate, diethylaminoethyl methacrylate, dimethylaminoethyl acrylamide, dimethylaminopropyl acrylamide, dimethylaminoethyl methacrylamide, dimethylaminopropyl methacrylamide, tert butylaminoethyl methacrylate, n-vinyl formamide, acrylamide, n,n-dimethylacrylamide, methacrylamide, diethylene glycol ethyl ether acrylate, and parachloromethyl styrene. Preferred are vinyl pyrrolidone, vinyl caprolactam, vinyl imidazole, vinyl carbazole, 2-vinyl pyridine, 4-vinyl pyridine, 5-vinyl pyridine and parachloromethyl styrene.

Examples of the cationic ethylenically unsaturated monomer (C) include quaternized versions of 2 vinyl pyridine, 4 vinyl pyridine, dimethylaminoethyl acrylate, diethylaminoethyl acrylate, dimethylaminopropyl acrylate, dimethylaminoethyl methacrylate, diethylaminoethyl methacrylate, dimethylaminoethyl acrylamide, dimethylaminopropyl acrylamide, dimethylaminoethyl methacrylamide, dimethylaminopropyl methacrylamide, tert butylaminoethyl methacrylate, as well as trimethylammonium ethyl acrylate chloride, trimethylammonium ethyl acrylate methyl sulfate, benzyldimethylammonium ethyl acrylate chloride, 4-benzoylbenzyl dimethylammonium ethyl acrylate chloride, methyl diethyl ammonium ethyl acrylate sulfate, trimethylammonium ethyl methacrylate chloride, trimethylammonium ethyl methacrylate methyl sulfate, benzyldimethylammonium ethyl methacrylate chloride, trimethylammonium ethyl acrylamido chloride, trimethylammonium ethyl methacrylamido chloride, trimethylammonium propyl acrylamido chloride, trimethylammonium propyl methacrylamido chloride, 3-trimethylammonium-2-hydroxypropyl-1-dimethylammonium propyl methacrylamide, diallyl dimethyl ammonium chloride, vinyl benzyl dimethyl amine, and vinyl benzyl trimethylammonium chloride.

An example of a copolymer of certain embodiments of (A), (B) and (C) is

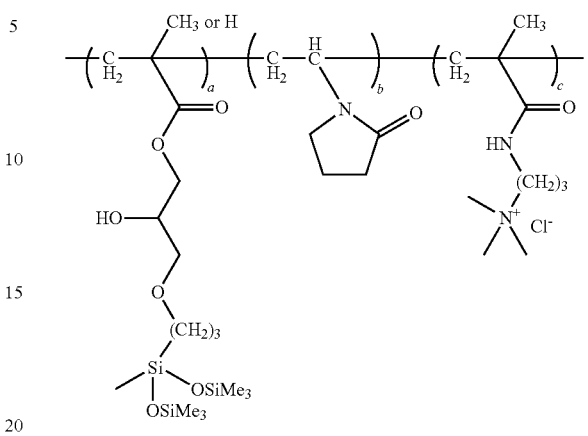

wherein the weight ratio of a:b:c is in the range of 4-10:70-86:10-20.

The copolymers of the invention have very unique properties for printing applications when forming a coating on plastic or other relatively non-porous media.

The cationic monomer (C) improves the wettability of the surface of the substrate and gives a good affinity to water-based inks. The neutral, hydrophilic, ethylenically unsaturated monomer (B) has the same affinity for water as monomer C), and is also a good film-forming component. Both monomers (B) and C) are water-soluble, as is the final copolymer.

The silyl-containing (meth)acrylate monomer brings a hydrophobic behavior to the dry polymer, with contact angles measurements between 120° and 145°, which means that water droplets bead on the surface. However, a small hydrophilic area is created under the drop because of surface reorganization and polymer hydrosolubility. As the surface is hydrophobic everywhere else, the drop remains pinned at a precise spot, without possibility of spreading. This property can be used to obtain high quality images on plastic and other non-porous surfaces by eliminating the bleeding problem normally associated with such surfaces.

The copolymers of monomers comprising at least one from each of (A), (B), and (C) can be prepared by any type of free radical polymerization by conventional methods. The copolymer can be dissolved in water using sufficient water to dissolve it, and the copolymer composition may also comprise a wetting agent, for example non-ionic surfactants.

In the case of aqueous solutions of the copolymers, they can be applied to the substrate or a portion of the substrate and then dried, forming a transparent coating having a contact angle with aqueous solutions of greater than 100° in some embodiments, and greater than 120° in other embodiments. The aqueous solutions are designed to form coatings when dried which pin aqueous droplets on non-porous substrates, thereby limiting their spreading on the surface and improving resolution when an aqueous ink formulation is deposited on the coating.

Tests were conducted with a terpolymer containing MAPTAC (methacrylamide propyl trimethyl ammonium chloride), vinylpyrrolidone (VP) and a silyl-containing monomer: methyl di(trimethylsiloxy)sylylpropylglycerol acrylate (later designated as silicone acrylate monomer, or SiAM) in weight ratio 15/75/10.

To assess the printing properties on hydrophobic media with the MAPTAC/VP/SiAM copolymer, a solution of this polymer was spin-coated on pieces of polyethylene transparencies. After drying, patterns were printed on the resulting coating with a traditional inkjet printer.

Three polymers were used as benchmarks: Polyquaternium 11 (cationic polymer), polyvinyl pyrrolidone (PVP) and polyvinyl alcohol (PVA, 98-99% hydrolyzed). A transparency specially designed for inkjet applications (rough surface, possibly silica) was also used as a benchmark, together with the non-treated polyethylene surface, and a transparency treated only with isopropyl alcohol.

To improve the wetting of the polyethylene surface, a water/isopropyl alcohol 70/30 mixture was used as solvent for the polymers. The films obtained by spin coating are very thin (less than 100 nm). To improve further the deposition of the coating, a wetting agent can be used, such as IPA. However, for a fully VOC-free formulation, a surfactant-like wetting agent is preferred, for example a non-ionic surfactant such as a silicone ether, fatty alcohol ethoxylate, or fatty acid ethoxylate.

The polymer can also be mixed with surfactants to improve the wetting of the hydrophobic surface.

After drying, the pinning effect observed with water drops on the copolymer surface is useful for printing applications on relatively non-porous substrates with waterborne inks. Due to the high contact angle observed on the copolymer, the ink does not spread on the surface and high quality prints are obtained.

The differences in printing quality are assessed by optical microscopy.

EXAMPLES

In the following examples, all parts and percentages are by weight unless otherwise indicated.

Example 1a

Synthesis of MAPTAC/Vinyl pyrrolidone/SiAM Copolymer

A 1 L kettle reactor equipped with a reflux condenser, a mechanical stirrer and a nitrogen inlet, after adequately purged with nitrogen, was charged with methanol (304.5 g), the full amount minus the volume held for making the dilutions of the initiator shots. This was followed by the addition of N-VP (97.88 g), 5% of the total amount of Maptac (50% in water, 1.96 g) and 5% of the total amount of silicone acrylate monomer (0.65 g). The headspace of the reactor was purged with nitrogen while the contents were brought to an internal temperature of 65° C. Once at temperature, the first shot of initiator (Vazo 56) was added (0.68 g) and the monomer feed containing 95% of the total amount of MAPTAC (37.19 g) and 95% of the total amount of silicone acrylate monomer was started and programmed to go over 80 minutes. Twenty minutes after the first shot of initiator a second shot was added of a similar amount of initiator. Similar shots of initiator were then added every 20 minutes, to complete five shots. The reactor contents were then left to react for 3 hours and 10 more minutes, at which time the reactor contents were heated to 75° C. Once at temperature, a sixth shot of initiator (0.78 g) is added and the reactor contents are left to stir for one more hour, before cooling and discharging the product.

Example 1b

MAPTAC/Vinyl Pyrrolidone/SiAM 15/75/10 Copolymer Cast on Glass

A glass surface is coated with an 8% solids solution of the MAPTAC/VP/SiAM 15/75/10 by weight terpolymer of Example 1a (2 mL of solution on a 7.5 cm*5 cm glass plate, spin coating 1500 rpm, 15 s). MAPTAC/VP/SiAM 15/75/10 films show an evolution of contact angle with time: it reaches ~130-140° after a few days (conditions 25° C., ~60% RH). The MAPTAC/VP/SiAM copolymer seems to reorganize during the drying process (possible migration of siloxanes, which are low energy groups, towards the surface). For this copolymer, printing tests are performed before and after the change of contact angle with time. After 1 day, the contact angle with water is 80°. After 6 days of drying in 75% relative humidity (RH) atmosphere (high humidity accelerates the reorganization of the surface), a contact angle of 138° is measured.

Example 2

MAPTAC/Vinyl Pyrrolidone/SiAM 15/80/5 Copolymer Cast on Glass

A glass surface is coated with an 8% solids solution of MAPTAC/VP/SiAM 15/80/5 (2 mL of solution on a 7.5 cm*5 cm glass plate, spin coating 1500 rpm, 15 s). After 1 day, the contact angle with water is 65°. After 6 days of drying in 75% R H atmosphere, a contact angle of 123° is measured.

Example 3

MAPTAC/Vinyl Pyrrolidone/SiAM 15/75/10 Copolymer Cast on PET

A polyethylene terephthalate (PET) surface is coated with an 8% solids solution of MAPTAC/VP/SiAM 15/75/10 of Example 1a (1.5 mL of solution on a 5 cm*5 cm PET sheet, spin coating 1500 rpm, 15 s). The solvent used is a water/isopropyl alcohol mixture (70/30), in order to have a sufficient wetting of the PET sheet by the solution. After 7 days of drying in 75% RH atmosphere, a contact angle of 140° is measured with water.

Example 4

Determination of Maximum Droplet Size Pinned by a MAPTAC/Vinyl Pyrrolidone/SiAM 15/75/10 Copolymer Cast on Glass, Compared to Non-Treated Glass Plate A glass plate is coated with the MAPTAC/VP/SiAM 15/75/10 copolymer as in Example 1b.

Figure 5:
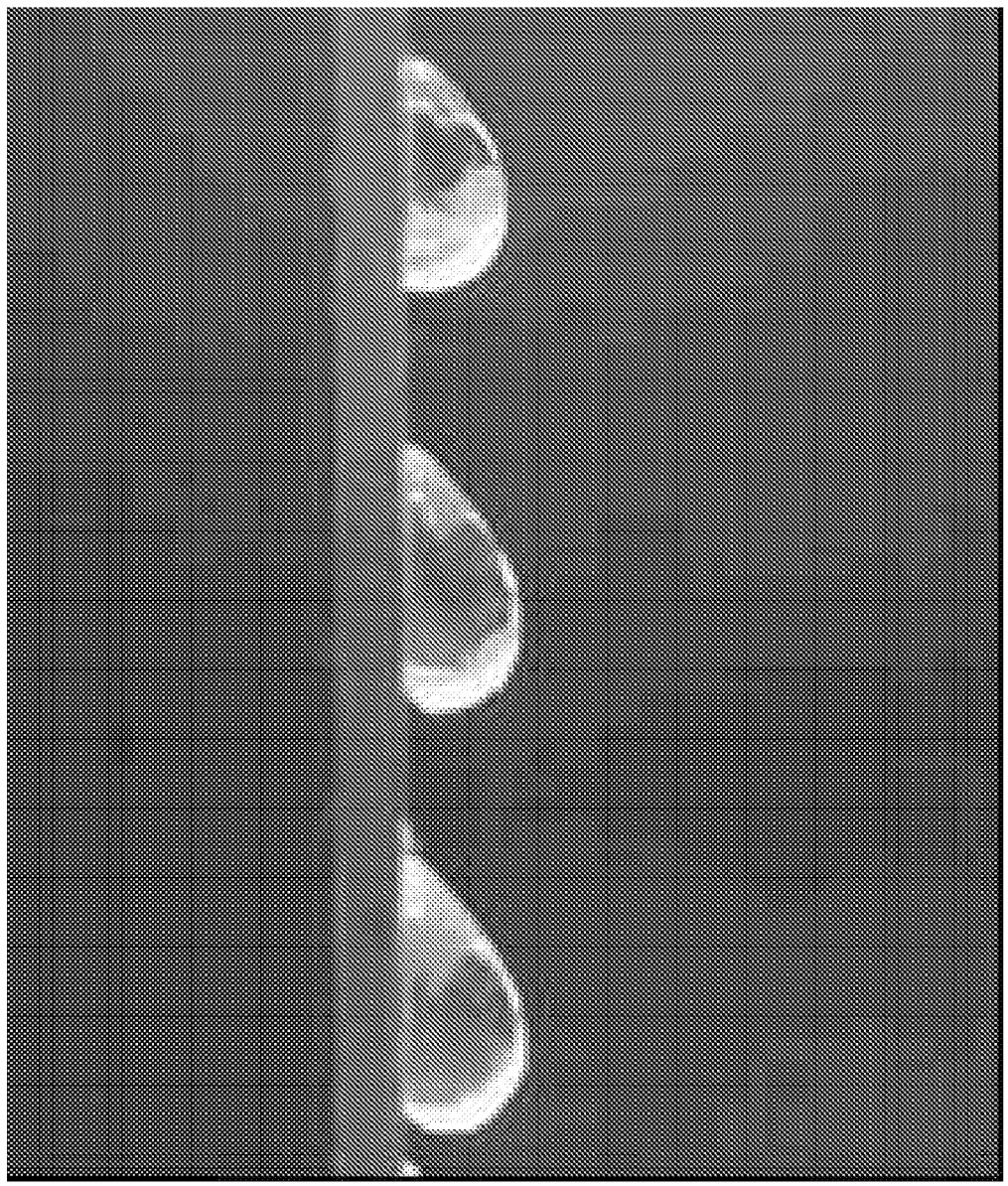
FIG. 5 is a photo of water droplets of 15, 20 and 25 µL deposited on a dried surface of the copolymer of the invention previously spin coated on a glass plate, which has been given an inclination angle of 90° just after deposition of the droplets.

A non-treated glass plate is used as reference. On clean glass, contact angle with water is about 25° (hydrophilic). Droplets of water of various sizes, from 2 µL to 60 µL, are deposited on each surface while it is horizontal. Just after deposition, the plates are inclined to an angle of 90°. We determine the minimal size for which the water droplet begins to roll on the surface. (FIG. 5)

On glass, droplets roll for a size above 4 µL; on the MAPTAC/VP/SiAM polymer surface of the invention, droplets roll for a size above 50 µL. This shows that the adhesion force of a droplet on a surface treated with a polymer according to the invention is larger since it can counterbalance gravity for larger droplets.

Example 5

Determination of Maximum Droplet Size Pinned by a MAPTAC/Vinyl Pyrrolidone/SiAM 15/75/10 Copolymer Cast on PET, Compared to Non-Treated PET Sheet A PET sheet is coated with the MAPTAC/VP/SiAM 15/75/10 copolymer as in Example 3.

(Comparative) A non-treated PET sheet is used as reference. Its contact angle with water is about 65°.

The same protocol as in Example 4 is used to determine the maximum droplet size pinned by the surface. On PET, droplets roll for a size above 6 μL; on the MAPTAC/VP/SiAM polymer surface, droplets roll for a size above 50 μL.

Example 6

Comparison of Maximum Droplet Size Pinned by a MAPTAC/Vinyl Pyrrolidone/SiAM 15/75/10 Copolymer Surface to a Teflon Surface Teflon is an hydrophobic surface that we chose to use as reference. Its contact angle with water is about 110°.

The maximum droplet size determined by the same protocol as in Example 4 is 6 μL, which is far below the 50 μL value determined on MAPTAC/VP/SiAM polymer of the invention, demonstrating that the copolymer of the invention can promote the adhesion of much larger droplets compared to a reference substrate such as Teflon having similar surface energy.

Examples 4 to 6 show that the MAPTAC/VP/SiAM polymer has an ability to pin water droplets far superior to other surfaces.

Example 7a

Mixture of MAPTAC/Vinyl Pyrrolidone/SiAM 15/75/10 Copolymer with Silicone Ether Surfactant An aqueous solution containing 5% solids of the MAPTAC/VP/SiAM copolymer of Example 1a and 0.5% of silicone ether surfactant Silwet L-77 is prepared and cast on a PET sheet as in Example 3. The presence of Silwet L-77 improves the wetting of the PET surface by the aqueous solution:

| Contact angles of different solutions on a PET surface |
| --- |
| Deionized water ~65° |
| Solution of MAPTAC/VP/SiAM 5% solids in water: ~25° |
| Solution of MAPTAC/VP/SiAM 5% solids + Silwet L-77 0.5%: ~10° |

After 7 days of drying in a 75% RH atmosphere, the PET sheet coated with MAPTAC/VP/SiAM copolymer as well as with a mixture of MAPTAC/VP/SiAM copolymer and Rhodasurf L show a contact angle of 137°. Though the polymer used for treating the surface is fully water soluble, it leads to interfaces that become very hydrophobic, after a period of time in order to let the coating develop its surface properties.

Example 7b

Mixture of MAPTAC/Vinyl Pyrrolidone/SiAM 15/75/10 Copolymer with Lauryl Alcohol Ethoxylate Surfactant An aqueous solution containing 5% solids of the MAPTAC/VP/SiAM copolymer of Example 1a and 0.5% of lauryl alcohol ethoxylate surfactant Rhodasurf L-790 is prepared and cast on a PET sheet as in Example 3. The presence of Rhodasurf L-790 improves the wetting of the PET surface by the aqueous solution:

| Contact angles of different solutions on a PET surface |
| --- |
| Deionized water ~65° |
| Solution of MAPTAC/VP/SiAM 5% solids in water: ~25° |
| Solution of MAPTAC/VP/SiAM 5% solids + Rhodasurf L-790 0.5%: ~20° |

After 7 days of drying in a 75% RH atmosphere, the PET sheet coated with MAPTAC/VP/SiAM copolymer shows a contact angle of 135°.

Example 8a

Isolated Color Droplets Printed on PET Sheets Having Received Different Polymer Treatments PET sheets are coated with various polymers, according to the protocol of Example 3: MAPTAC/VP/SiAM 15/75/10 copolymer, Polyquaternium 11 (cationic polymer), polyvinyl pyrrolidone (PVP) and polyvinyl alcohol (PVA, 98-99% hydrolyzed).

A transparency specially designed for inkjet applications (rough surface, possibly silica) is also used as a benchmark, together with the non-treated polyethylene surface, and a transparency treated only with isopropyl alcohol.

A light shade is printed on every PET sheet with a HP Deskjet 5740, in order to obtain isolated color droplets on the surface. Optic microscopy is used to compare to quality of the different printings. For comparative surfaces not coated with the copolymer of the invention, the isolated color droplets coalesce and appear as a single droplet under optical microscopy.

Microscope photos of isolated ink droplets (FIG. 4a to FIG. 4g) show that there is less coalescence between ink droplets on a surface treated with MAPTAC/VP/SiAM copolymer than on a non treated surface or a surface treated with another polymer. Spots have a smaller size and the different colors are better separated. On a MAPTAC/VP/SiAM surface, each ink droplet remains at its location, without mixing with nearby droplets. Better results in term of diameter and circularity of ink dots are achieved (limited bleeding on the surface).

Example 8b

Figure 6:
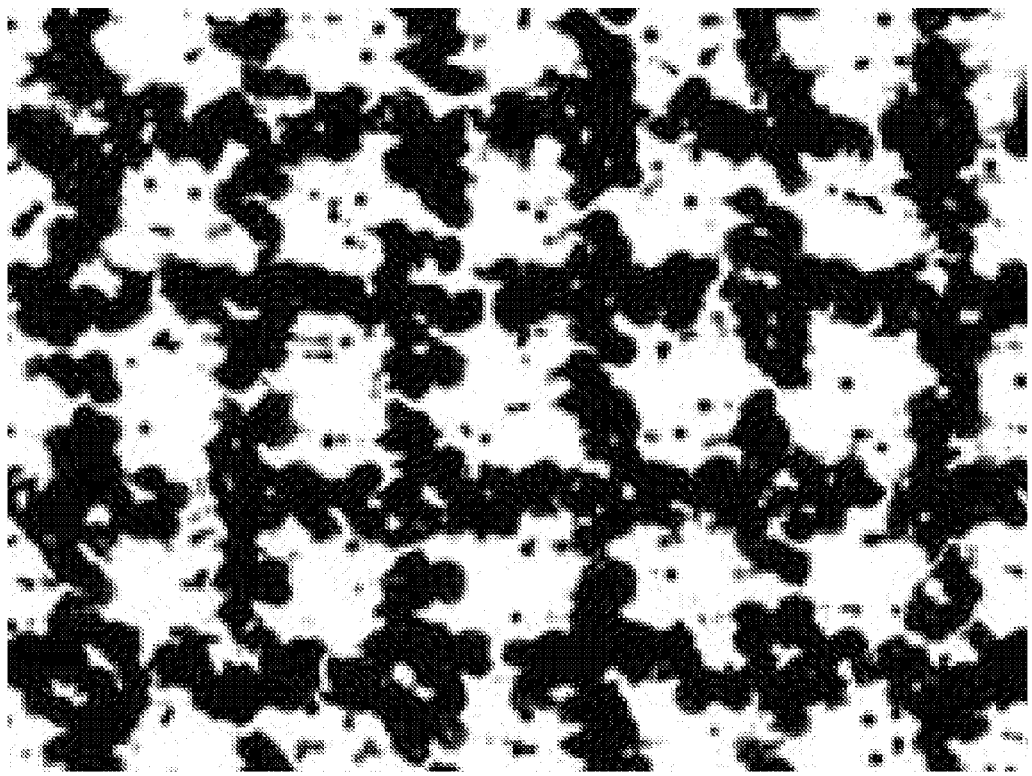
FIG. 6 is a microscope photo of a black grid pattern printed on a dried surface of the copolymer of the invention previously spin coated on a PET sheet.

Black Grid Pattern Printed on PET Sheets Having Received Different Polymer Treatments PET sheets having received the same polymer treatments as in Example 8b are printed with a black grid pattern using a HP Deskjet 5740 printer. The line widths are about 100 nm. (FIG. 6)

Figure 7:
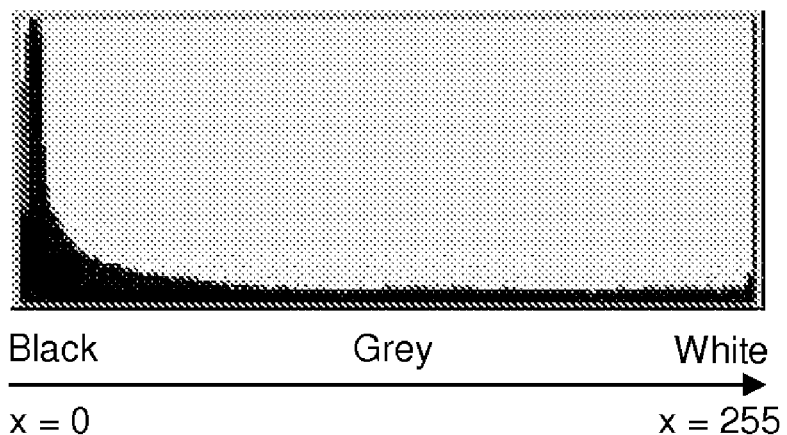
FIG. 7 is a graph showing the repartition of pixels from black (x=0) to white (x=255)

For each treatment, we can obtain histograms showing the repartition of pixels from black (x=0) to white (x=255) of the photo of the grid (FIG. 7). Two values are then calculated to compare the quality of the different printings: the "percentage of surface printed" and the "percentage of grey".

The "percentage of surface printed" corresponds to the ratio of pixels x=0=>254 among all pixels. A low value means that there are lots of white pixels (x=255), so that the ink had a limited bleeding on the surface.

The "percentage of grey" corresponds to the ratio of pixels x=10=>50 among all pixels. When ink spreads on the surface, the quality of black decreases and a lot of "grey pixels" appear, especially in the area from x=10 to x=50. When the "percentage of grey" is low, it means that the quality of black is good; there is little or no grey area around the grid which should be black.

Figure 8:
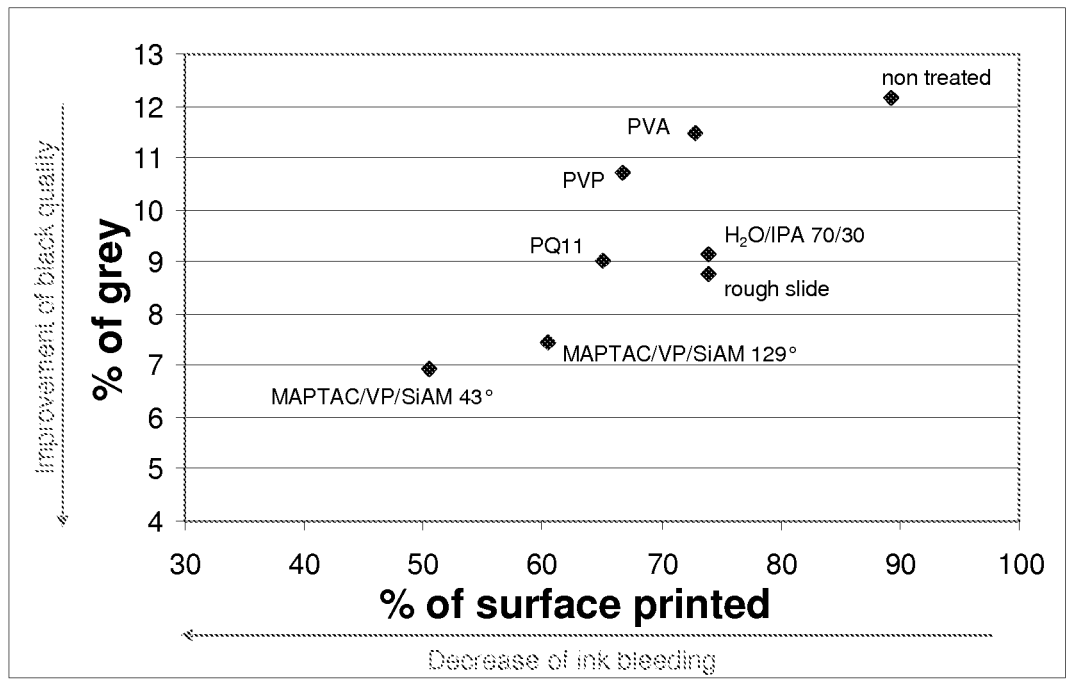
FIG. 8 is a graph representing the percentage of surface printed and the percentage of grey for PET surface having received different treatments.

A graph representing both values for each surface treatment is plotted (FIG. 8). The best results are for a low percentage of surface printed, and a low percentage of grey; according to the graph, the MAPTAC/VP/SiAM polymer performs better than the other treatments.

Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed is:

1. A composition comprising a silyl-containing copolymer of a monomer system comprising:
   (A) a silyl-containing monomer having a structural formula I

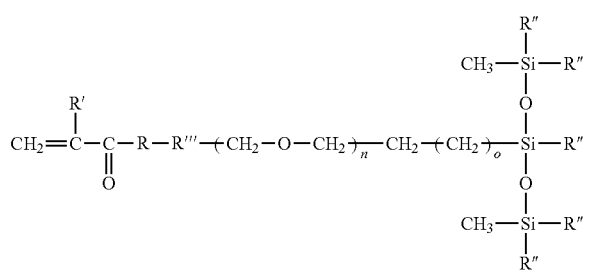

Wherein n=1-20, o=1-5
R=O or NH
R'=H or CH3
R"=$C_1$-$C_{12}$ alkyl

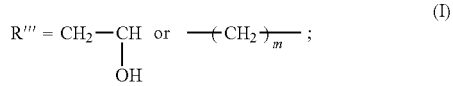

wherein m=1-20
   (B) a neutral, hydrophilic, ethylenically unsaturated monomer; and
   (C) a cationic ethylenically unsaturated monomer,
   wherein the weight of (A):(B):(C) is 4-10:70-86:10-20.

2. The composition of claim 1 wherein (A) is represented by formula (II)

3. The composition of claim 1 wherein the silyl-containing monomer, (A), of formula I is methyl di(trimethylsiloxy)silylpropylglycerol acrylate or methyl di(trimethylsiloxy)silylpropylglycerol methacrylate.

4. The composition of claim 1 wherein (B) is selected from the group consisting of vinyl pyrrolidone, vinyl caprolactam, vinyl imidazole, vinyl carbazole, 2-vinyl pyridine, 4-vinyl pyridine, 5-vinyl pyridine, hydroxyethyl methacrylate, hydroxyethyl acrylate, hydroxypropyl methacrylate, hydroxypropyl acrylate, glycerol monomethacrylate, dimethylaminoethyl acrylate, dimethylaminopropyl acrylate, dimethylaminoethyl methacrylate, diethylaminoethyl methacrylate, dimethylaminoethyl acrylamide, dimethylaminopropyl acrylamide, dimethylaminoethyl methacrylamide, dimethylaminopropyl methacrylamide, tert butylaminoethyl methacrylate, N-vinyl formamide, acrylamide, N,N-dimethylacrylamide, methacrylamide, diethylene glycol ethyl ether acrylate, and parachloromethyl styrene.

5. The composition of claim 1 wherein (B) is selected from the group consisting of vinyl pyrrolidone, vinyl caprolactam, vinyl imidazole, vinyl carbazole, 2-vinyl pyridine, 4-vinyl pyridine, 5-vinyl pyridine and parachloromethyl styrene.

6. The composition of claim 1 wherein the cationic ethylenically unsaturated monomer (C) is selected from the group consisting of the quaternized version of: 2 vinyl pyridine, 4 vinyl pyridine, dimethylaminoethyl acrylate, diethylaminoethyl acrylate, dimethylaminopropyl acrylate, dimethylaminoethyl methacrylate, diethylaminoethyl methacrylate, dimethylaminoethyl acrylamide, dimethylaminopropyl acrylamide, dimethylaminoethyl methacrylamide, dimethylaminopropyl methacrylamide, tert butylaminoethyl methacrylate, as well as trimethylammonium ethyl acrylate chloride, trimethylammonium ethyl acrylate methyl sulfate, benzyldimethylammonium ethyl acrylate chloride, 4-benzoylbenzyl dimethylammonium ethyl acrylate chloride, methyl diethyl ammonium ethyl acrylate sulfate, trimethylammonium ethyl methacrylate chloride, trimethylammonium ethyl methacrylate methyl sulfate, benzyldimethylammonium ethyl methacrylate chloride, trimethylammonium ethyl acrylamido chloride, trimethylammonium ethyl methacrylamido chloride, trimethylammonium propyl acrylamido chloride, trimethylammonium propyl methacrylamido chloride, 3-trimethylammonium-2-hydroxypropyl-1-dimethylammonium propyl methacrylamide, diallyl dimethyl ammonium chloride, vinyl benzyl dimethyl amine, and vinyl benzyl trimethylammonium chloride.

7. The composition of claim 1 wherein the copolymer has the structural formula IV as follows:

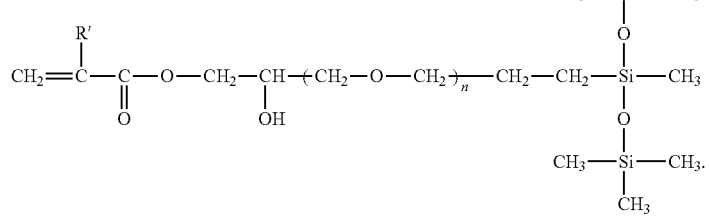

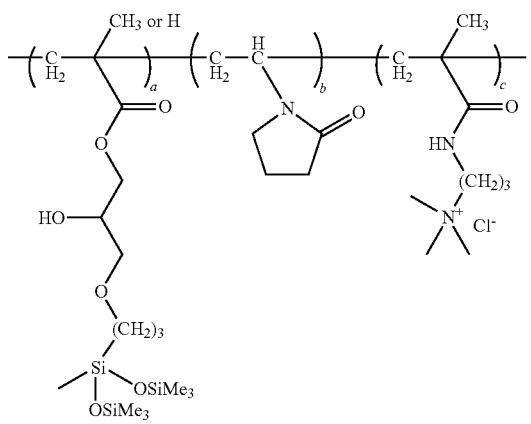

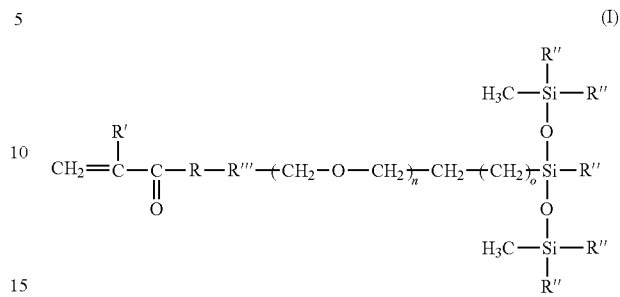

wherein the weight ratio of a:b:c is in the range of 4-10:70-86:10-20.

8. The composition of claim 1 in the form of a solution, comprising sufficient water to dissolve the copolymer.

9. The composition of claim 1, further comprising a wetting agent.

10. The composition of claim 1 further comprising up to 10 percent based on copolymer of a wetting agent selected from the group consisting of non ionic-surfactants.

11. The composition of claim 1 in the form of an aqueous solution which, when applied to a substrate or a portion of a substrate and dried, forms a transparent coating having a contact angle with aqueous solutions greater than 100°.

12. The composition of claim 1 in the form of an aqueous solution which, when applied to a substrate or a portion of a substrate and dried, forms a transparent coating having a contact angle with aqueous solutions greater than 120°.

13. The composition of claim 1 in the form of an aqueous solution having properties such that when coated on a substrate and dried, the resultant coating pins aqueous droplets, thereby limiting their spreading on the surface and improving resolution when an aqueous ink formulation is deposited thereon.

14. A substrate coated with the composition of claim 1.

15. A substrate selected from the group consisting of paper, polyethylene, polyethylene terephthalate, polyester, polyamide, polycarbonate, and polypropylene coated with the composition of claim 1.

16. A substrate selected from the group consisting of paper, polyethylene, polyethylene terephthalate, polyester, polyamide, polycarbonate, and polypropylene, coated with the composition of claim 1, the coated substrate adapted to receive conductive or non-conductive aqueous ink with substantially low bleeding and improved resolution.

17. A method of producing images with water based ink on a surface with no bleeding comprising the steps of: (a) providing an object having a surface; (b) coating at least part of the surface of the object with an aqueous solution comprising a silyl-containing copolymer; (c) evaporating off the volatile part of the mixture, thus depositing a solid hydrophobic layer on the surface of the object without causing the coating to cross-link; (d) providing ink comprising a colorant and aqueous carrier; and (e) applying the ink onto the surface of the coating on the object, the silyl-containing copolymer being comprised of a copolymer of a monomer system comprising:

(A) a silyl-containing monomer having a structural formula I

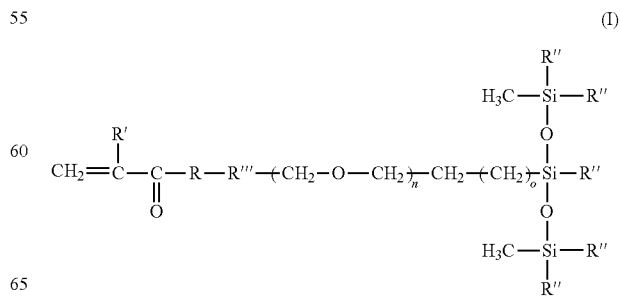

wherein n=1-20, o=1-5
R=O or NH
R'=H or $CH_3$
R"=$C_1$-$C_{12}$ alkyl
R'''=$CH_2CH(OH)$ or $-(CH_2)-_m$ wherein m-1-20;

(B) a neutral, hydrophilic, ethylenically unsaturated monomer; and (C) a cationic ethylenically unsaturated monomer.

18. The method of claim 17 wherein the surface is selected from the group consisting of a fluorinated polymer, polyimide, epoxy resin, polycarbonate, polyester, polyethylene, polypropylene, polycarbonate, polyvinyl chloride, ABS copolymer, wood, paper, metallic foil, glass, flexible fiberboard, non-woven polymeric fabric, and cloth.

19. The method of claim 17 wherein the water based ink is applied, (e), by jetting the ink by means of an ink-jet system onto the surface of the coating on the object; and further comprising a step (f) of warming the printed surface to drive part of the water in the ink into the coating and to evaporate the remaining part of the water.

20. A method for forming at least a portion of an electronic feature, the process comprising the steps of: (a) providing a first substrate having a first surface; (b) coating the first surface with an aqueous solution comprising a silyl-containing copolymer to form a modified surface; and (c) applying an ink to at least a portion of the modified surface, wherein the modified surface interacts with the ink to inhibit one or both lateral migration and/or longitudinal migration of the applied ink, and wherein the applied ink forms at least a portion of the electronic feature, the silyl-containing copolymer being comprised of a copolymer of a monomer system comprising:

(A) a silyl-containing monomer having a structural formula I wherein n=1-20, o=1-5
R=O or NH
R'=H or $CH_3$
R"=$C_1$-$C_{12}$ alkyl
R'''=$CH_2CH(OH)$ or —$(CH_2)$—$_m$ wherein m-1-20;

(B) a neutral, hydrophilic, ethylenically unsaturated monomer; and
(C) a cationic ethylenically unsaturated monomer.

* * * * *

UNITED STATES PATENT AND TRADEMARK OFFICE
CERTIFICATE OF CORRECTION

| | | |
|---|---|---|
| PATENT NO. | : 8,025,918 B2 | Page 1 of 1 |
| APPLICATION NO. | : 12/271241 | |
| DATED | : September 27, 2011 | |
| INVENTOR(S) | : Julie Broguiere, Jean-Christophe Castaing and Gilda M. Lizarraga | |

It is certified that error appears in the above-identified patent and that said Letters Patent is hereby corrected as shown below:

Claim 1 (in column 11, line 50): "wherein the weight of (A):(B):(C) is 4-10:70-86:10-20" should read --wherein the weight ratio of (A):(B):(C) is 4-10:70-86:10-20--.

Signed and Sealed this
Sixth Day of March, 2012

David J. Kappos
*Director of the United States Patent and Trademark Office*